United States Patent
Wu et al.

(10) Patent No.: US 12,124,978 B2
(45) Date of Patent: Oct. 22, 2024

(54) METHOD FOR OPTIMIZING TRANSFORMATION OF AUTOMATION EQUIPMENT IN A POWER DISTRIBUTION NETWORK BASED ON RELIABILITY CONSTRAINTS

(71) Applicant: Tsinghua University, Beijing (CN)

(72) Inventors: Wenchuan Wu, Beijing (CN); Boming Zhang, Beijing (CN); Zihao Li, Beijing (CN); Hongbin Sun, Beijing (CN); Bin Wang, Beijing (CN); Qinglai Guo, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 417 days.

(21) Appl. No.: 17/555,498

(22) Filed: Dec. 19, 2021

(65) Prior Publication Data

US 2022/0114507 A1 Apr. 14, 2022

Related U.S. Application Data

(63) Continuation of application No. PCT/CN2020/088979, filed on May 7, 2020.

(30) Foreign Application Priority Data

Apr. 9, 2020 (CN) .......................... 202010272353.2

(51) Int. Cl.
*G06Q 10/04* (2023.01)
*G05B 19/042* (2006.01)
(Continued)

(52) U.S. Cl.
CPC .......... *G06Q 10/04* (2013.01); *G05B 19/042* (2013.01); *G06Q 50/06* (2013.01); *H02J 3/0012* (2020.01);
(Continued)

(58) Field of Classification Search
CPC ...... G06Q 10/04; G06Q 50/06; G05B 19/042; G05B 2219/2639; H02J 3/0012;
(Continued)

(56) References Cited

U.S. PATENT DOCUMENTS

| 2008/0177678 A1* | 7/2008 | Di Martini | G06Q 10/06 705/412 |
| 2019/0042960 A1* | 2/2019 | Lindner | G06N 7/01 |
| 2020/0091765 A1* | 3/2020 | Bahramirad | G01R 21/133 |

FOREIGN PATENT DOCUMENTS

| CN | 105186500 A | * | 12/2015 | |
| CN | 107979092 A | * | 5/2018 | ........... G06F 30/367 |
| CN | 111555265 A | * | 8/2020 | ........... G05B 19/042 |

OTHER PUBLICATIONS

Tang, Y., 1996. Power distribution system planning with reliability modeling and optimization. IEEE Transactions on Power Systems, 11(1), pp. 181-189. (Year: 1996).*

(Continued)

*Primary Examiner* — Alicia M. Choi
(74) *Attorney, Agent, or Firm* — Hodgson Russ LLP

(57) ABSTRACT

The present disclosure provides a method for optimizing transformation of automation equipment in a power distribution network based on reliability, including determining installation states of respective components in the power distribution network and operation criterions for fault isolation, load transfer and fault recovery after a fault occurred in a feeder segment; determining a target function which is a target function for minimizing a total transformation cost of the power distribution network; determining constraint conditions including reliability constraints; establishing an optimization model for evaluating the reliability of the power distribution network based on the reliability constraints in accordance with the target function and the constraints; and solving the established optimization model (Continued)

for evaluating the reliability of the power distribution network based on the reliability constraints to obtain optimal solutions as optimization results of the automation transformation state of the circuit breaker and the switch and the reliability index.

6 Claims, 1 Drawing Sheet

(51) Int. Cl.
  *G06Q 50/06* (2012.01)
  *H02J 3/00* (2006.01)
(52) U.S. Cl.
  CPC ... *G05B 2219/2639* (2013.01); *H02J 2203/20* (2020.01)

(58) Field of Classification Search
  CPC ........ H02J 2203/20; H02J 3/001; H02H 3/06; Y02E 60/00; Y04S 10/50; Y04S 40/20
  See application file for complete search history.

(56) References Cited

OTHER PUBLICATIONS

Munoz-Delgado, G., Contreras, J. and Arroyo, J.M., 2016. Reliability assessment for distribution optimization models: A non-simulation-based linear programming approach. IEEE Transactions on Smart Grid, 9(4), pp. 3048-3059. (Year: 2016).*
WIPO, International Search Report for PCT/CN2020/088979, Jan. 12, 2021.

* cited by examiner

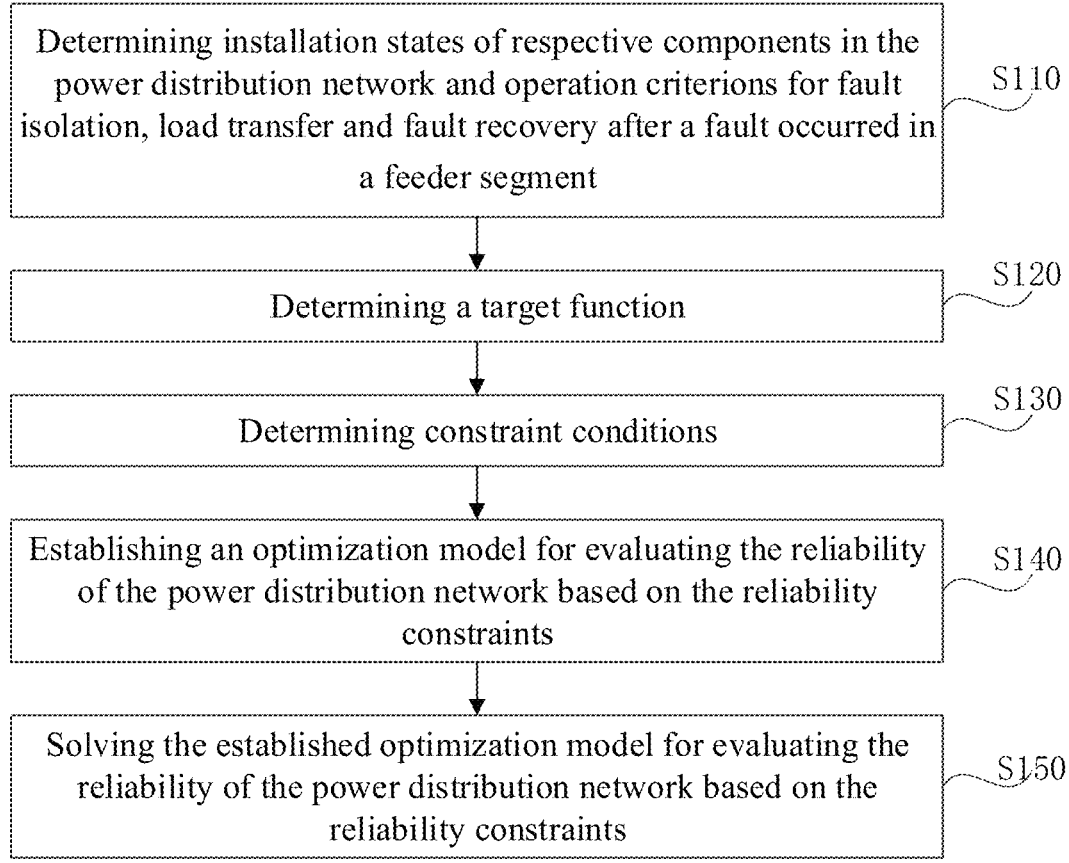

METHOD FOR OPTIMIZING TRANSFORMATION OF AUTOMATION EQUIPMENT IN A POWER DISTRIBUTION NETWORK BASED ON RELIABILITY CONSTRAINTS

CROSS REFERENCE TO RELATED APPLICATION

This application is a continuation of International Application No. PCT/CN2020/088979, filed May 7, 2020, which claims priority to Chinese Application No. 202010272353.2, filed Apr. 9, 2020, the entire disclosures of which are incorporated herein by reference.

TECHNICAL FIELD

The present disclosure relates to a field of power system programming and evaluation technologies, and more particularly to a method for optimizing transformation of automation equipment in a power distribution network based on reliability constraints.

BACKGROUND

With increased requirements of users to the reliability of power supply, a feeder line automation system is widely used in a power distribution network in urban areas. To improve the reliability and flexibility of the power distribution network, it is necessary to carry out automation transformation to the conventional power distribution network, i.e., to upgrade circuit breakers and switchgears that would only be operated manually to automatic circuit breakers and switchgears. However, transforming the entire power distribution network would lead to a huge investment.

In the field of power, the reliability refers to a capability of the power system to continuously meet the quantity and quality of the power required by the end users. The reliability of the power distribution network mainly includes the following indications: a customer interruption frequency (CIF), a customer interruption duration (CID), a system average interruption frequency index (SAIFI), a system average interruption duration index (SAIDI), and an expected energy not supplied (EENS).

In current approaches applied for transforming the circuit breakers and the switchgears in the power distribution network, heuristic optimization algorithms, such as an ant colony algorithm, a genetic algorithm, a simulated annealing algorithm, etc., may be required. However, such approaches take a long time, require a large memory space, generate unstable solutions per calculation, and could not guarantee optimal search results. Therefore, it is not possible to implement an ideal transformation to the automation equipment in the power distribution network, such as the circuit breakers and switchgears.

SUMMARY

The present disclosure aims to solve at least one of technical solutions in the related art to some extents.

According to one aspect, the present disclosure provides a method for optimizing transformation of automation equipment in a power distribution network based on reliability, including:
determining installation states of respective components in the power distribution network and operation criterions for fault isolation, load transfer and fault recovery after a fault occurred in a feeder segment;
determining a target function, the target function being a target function for minimizing a total transformation cost $c^{Total}$ of the power distribution network, as expressed by the following formula (1):

$$\text{Minimize } c^{Total} = \sum_{ij \in \Omega} c_{ij}^{Up}(x_{ij}^A - x_{ij}^{A,E}) \qquad (1)$$

where
$c_{ij}^{Up}$ represents a transformation cost for upgrading equipment ij in the power distribution network;
$\Omega$ represents a set of all the equipment in the power distribution network, including the circuit breaker and switch;
$x_{ij}^A$ represents a 0-1 variation indicating an automatic status of the equipment ij after the transformation, with $x_{ij}^A=1$ indicating an automatic equipment and $x_{ij}^A=0$ indicating a non-automatic equipment; and
$x_{ij}^{A,E}$ represents a 0-1 variation indicating the automatic status of the equipment ij before the transformation, with $x_{ij}^{A,E}=1$ indicating the automatic equipment and $x_{ij}^{A,E}=0$ indicating the non-automatic equipment;
determining constraint conditions, the constraint conditions including reliability constraints, as expressed by the following formulas (2) to (7):

$$CID_i = \sum_{s \in \Upsilon_f} \lambda_s t_i^{in,s} \qquad (2)$$

$$SAIDI = \frac{\sum_{i \in \Upsilon_f, \forall f} NC_i CID_i}{\sum_{i \in \Upsilon_f, \forall f} NC_i} \qquad (3)$$

$$EENS = \sum_{h \in H} \frac{\Delta_h}{8760} \sum_{i \in \Psi} CID_i \mu_h L_i \qquad (4)$$

$$CID_i \leq \varepsilon_i^{CID}, \forall i \in \Upsilon_f, \forall f \qquad (5)$$

$$SAIDI \leq \varepsilon^{SAIDI} \qquad (6)$$

$$EENS \leq \varepsilon^{EENS} \qquad (7)$$

where
$CID_i$ represents average outage time of a branch (feeder segment) i of a feeder line f in the power distribution network per year;
$\Upsilon_f$ represents a set of all the feeder segments of the feeder line f;
$\lambda_s$ represents a failure rate of a feeder segment s per year;
$t_i^{in,s}$ represents an outage time in a failure scenario of the feeder segment s;
SAIDI represents an average outage time of the system per year;
$NC_i$ represents a number of users in the feeder segment i;
EENS represents an expected loss of load energy;
H represents a set of all load levels;
$\Delta_h$ represents hours for which the load level h lasts per year;
$\Psi$ represents a set of all the nodes in the power distribution network;
$\mu_h$ represents a peak load ratio of the load level h and $\mu_h \leq 1$;
$L_i$ represents a peak load at the node i;

$\varepsilon_i^{CID}$ represents an upper limit for the average outage time of the feeder segment i per year;

$\varepsilon_i^{SAIDI}$ represents an upper limit for the average outage time of the system per year; and $\varepsilon^{EENS}$ represents an upper limit for the expected loss of load energy of the system;

establishing an optimization model for evaluating the reliability of the power distribution network based on the reliability constraints in accordance with the target function and the constraints; and solving the established optimization model for evaluating the reliability of the power distribution network based on the reliability constraints to obtain an optimal solution of the 0-1 variable $x_{ij}^A$ indicating an automatic status of the equipment ij after the transformation, as an optimization result of the automation transformation state of the circuit breaker and the switch, and to obtain optimal solutions of the customer interruption duration $CID_i$ of the feeder segment i, the system average interruption duration SAIDI and the expected energy not supplied EENS an optimization result of the reliability index, so as to transform the automation equipment in the distribution network based on the optimization result of the automation transformation state and the reliability index, wherein the power distribution network includes at least one feeder line;

a circuit breaker that is capable of interrupting a fault current is installed at the head of each feeder line;

each feeder line is divided into a plurality of feeder segments via at least one interconnection switch that is not capable of interrupting the fault current;

at least one of the plurality of feeder segments is a feeder segment that is contained in a feeder corridor;

0 or 1 interconnection switch is provided between each feeder line and other feeder line; and the distribution network includes an automatic circuit breaker and an automatic switch which detects currents and voltages in interfaces at both ends of the feeder line and make response accordingly, and a non-automatic circuit breaker and a non-automatic switch which are operated manually, and wherein, the step of determining installation states and operation criterions further includes:

a) opening the automatic circuit breaker or the non-automatic circuit breaker at the head of the feeder line a feeder segment belongs to, upon the feeder segment fails, to interrupt the fault current, resulting in power outage in downstream nodes of the circuit breaker, and all the automatic switches in the feeder line the feeder segment belongs to being opened;

b) entering an automatic operation stage in the upstream of fault and proceeding to step c) if the circuit breaker is the automatic circuit breaker, or proceeding to step g) if the circuit breaker is the non-automatic circuit breaker;

c) reclosing the automatic circuit breaker in the automatic operation stage in the upstream of fault;

d) in response to the reclosing operation not triggering a further tripping operation of the circuit breaker, sensing a one-side normal voltage by the first automatic switch in the downstream of the circuit breaker and closing the first automatic switch in a short interval, or in response to the reclosing operation triggering a further tripping operation of the circuit breaker, proceeding to step g);

e) sensing the one-side normal voltage by other automatic switches and closing the other automatic switches sequentially on a timed interval after the first automatic switch in the downstream of the circuit breaker is closed, until the closing operation of an automatic switch which has been just closed causes a second fault tripping, such that all the circuit breakers in the upstream of the automatic switch which has been just closed are tripped, all the automatic switches in the feeder line are opened again, causing the automatic switch which has been just closed and caused the second fault tripping to be opened and locked in the open state;

f) reclosing the automatic circuit breaker again, and repeating the steps d) to e) until all switches in a non-locked state in the upstream of the fault are reclosed again, and entering an automatic operation stage in the downstream of fault;

g) in response to an automatic interconnection switch existing in the downstream of the fault, closing the automatic interconnection switch after a preset delay time after the fault occurred in the automatic operation stage in the downstream of fault;

h) in response to the closing operation of the automatic interconnection switch not triggering a tripping operation of the interconnection switch, sensing the one-side normal voltage by the first automatic switch in the upstream of the automatic interconnection switch and closing the first automatic switch in a short interval, or in response to the closing operation of the automatic interconnection switch triggering the tripping operation, proceeding to step k);

i) sensing the one-side normal voltage by other automatic switches and closing the other automatic switches sequentially on a timed interval after the first automatic switch in the upstream of the automatic interconnection switch is closed, until the closing operation of an automatic switch which has been just closed causes a tripping of the automatic interconnection switch, such that all the automatic switches in the feeder line in the downstream of fault are opened again, causing the automatic switch which has been just closed and caused the tripping of the automatic interconnection switch to be opened and locked in the open state;

(j) closing the automatic interconnection switch again, and repeating the steps h) to i) until all the automatic switches in an unlocked state in the downstream of fault are closed again, and entering an post-fault manual operation stage; and (k) operating the circuit breaker and the switch manually in the post-fault manual operation stage, to further isolate the fault and to restore the affected load from the fault, such that the faulty feeder segment is restored, and the power distribution network are restored to its original structure by operating the switch and the circuit breaker.

BRIEF DESCRIPTION OF THE DRAWINGS

FIG. 1 illustrates a flow chart showing a method for optimizing transformation of automation equipment in a power distribution network based on reliability constraints according to an embodiment of the present disclosure.

DETAILED DESCRIPTION

The example embodiments will be described in detail here, and examples thereof are shown in the accompanying drawings.

FIG. 1 illustrates a flow chart showing a method for optimizing transformation of automation equipment in a power distribution network based on reliability constraints according to an embodiment of the present disclosure.

As shown in FIG. 1, the method for optimizing the transformation of the automation equipment in the power distribution network based on the reliability constraints according to the embodiment of the present disclosure may include the following steps.

In step S110, installation states of respective components in the power distribution network and operation criterions for fault isolation, load transfer and fault recovery after a fault occurred in a feeder segment are determined.

The power distribution network includes at least one feeder line. A circuit breaker that is capable of interrupting a fault current may be installed at the head of each feeder line. Each feeder line may be divided into a plurality of feeder segments (branches) via at least one interconnection switch that is not capable of interrupting the fault current. At least one of the plurality of feeder segments is a feeder segment that is contained in a feeder corridor. There may be 0 or 1 interconnection switch provided between each feeder line and other feeder line. That is, there is at most one interconnection switch for each feeder line. The distribution network may include an automatic circuit breaker and an automatic switch that may detect currents and voltages in interfaces at both ends of the feeder line and make response accordingly, and a non-automatic circuit breaker and a non-automatic switch that need to be operated manually.

Step S110 may further include the following steps.
a) Upon a feeder segment fails, the automatic circuit breaker or the non-automatic circuit breaker at the head of a feeder line the feeder segment belongs to is opened first to interrupt the fault current, resulting in power outage in downstream nodes of the circuit breaker. Additionally, all the automatic switches in the feeder line the feeder segment belongs to are opened.
b) Then, the process enters an automatic operation stage in the upstream of fault, in which the process proceeds to step c) if the circuit breaker is the automatic circuit breaker. Otherwise, the process proceeds to step g) if the circuit breaker is the non-automatic circuit breaker.
c) In the automatic operation stage in the upstream of fault, the automatic circuit breaker is reclosed.
d) If the reclosing operation does not trigger a further tripping operation of the circuit breaker, the first automatic switch in the downstream of the circuit breaker will sense a one-side normal voltage and be closed in a short interval, generally 3-5 seconds. On the other hand, if the reclosing operation triggers a further tripping operation of the circuit breaker, the process proceeds to step g).
e) After the first automatic switch in the downstream of the circuit breaker is closed, other automatic switches sequentially sense the one-side normal voltage and are then closed on a timed interval, generally 3-5 seconds, until the closing operation of an automatic switch which has been just closed causes a second fault tripping. Then, all the circuit breakers in the upstream of the automatic switch which has been just closed are tripped. Additionally, all the automatic switches in the feeder line are opened again. At this time, the automatic switch which has been just closed and caused the second fault tripping is opened and locked in the open state.
f) The automatic circuit breaker is reclosed again. The steps d) to e) are repeated until all switches in a non-locked state in the upstream of the fault are reclosed again. Then, the process enters an automatic operation stage in the downstream of fault.
g) In the automatic operation stage in the downstream of fault, if there is an automatic interconnection switch in the downstream of the fault, the automatic interconnection switch will be closed after a preset delay time, generally 30 seconds, after the fault occurred.
h) If the closing operation of the automatic interconnection switch does not trigger a tripping operation of the interconnection switch, the first automatic switch in the upstream of the automatic interconnection switch senses the one-side normal voltage and is then closed in a short interval, generally 3-5 seconds. On the other hand, if the closing operation of the automatic interconnection switch triggers the tripping operation, the process turns to step k).
i) After the first automatic switch in the upstream of the automatic interconnection switch is closed, other automatic switches sequentially sense the one-side normal voltage and are then closed on a timed interval, generally 3-5 seconds, until the closing operation of an automatic switch which has been just closed causes a tripping of the automatic interconnection switch. Then, all the automatic switches in the feeder line in the downstream of fault are opened again. At this time, the automatic switch which has been just closed and caused the tripping of the automatic interconnection switch is opened and locked in the open state.
(j) The automatic interconnection switch is closed again. The steps h) to i) are repeated until all the automatic switches in an unlocked state in the downstream of fault are closed again. Then, the process enters an post-fault manual operation stage; and
(k) In the post-fault manual operation stage, generally 30 minutes to 2 hours after the occurring of the fault, the circuit breaker and the switch are operated manually, to further isolate the fault and to restore the affected load from the fault. Finally, the faulty feeder segment is restored. Then, the power distribution network are restored to its original structure by operating the switch and the circuit breaker.

In step S120, a target function is determined. The target function is a target function for minimizing a total transformation cost $c^{Total}$ of the power distribution network, as expressed by the following formula (1):

$$\text{Minimize } c^{Total} = \sum_{ij \in \Omega} c_{ij}^{Up}(x_{ij}^A - x_{ij}^{A,E}) \qquad (1)$$

Here, $c_{ij}^{Up}$ represents a transformation cost for upgrading equipment ij in the power distribution network; $\Omega$ represents a set of all the equipment in the power distribution network, including the circuit breaker and switch; $x_{ij}^A$ represents a 0-1 variation indicating an automatic status of the equipment ij after the transformation, with $x_{ij}^A=1$ indicating an automatic equipment and $x_{ij}^A=0$ indicating a non-automatic equipment; and $x_{ij}^{A,E}$ represents a 0-1 variation indicating the automatic status of the equipment ij before the transformation, with $x_{ij}^{A,E}=1$ indicating the automatic equipment and $x_{ij}^{A,E}=0$ indicating the non-automatic equipment.

In step S130, constraint conditions are determined. The constraint conditions may include reliability constraints, as expressed by the following formulas (2) to (7):

$$CID_i = \sum_{s \in \Upsilon_f} \lambda_s t_i^{in,s} \tag{2}$$

$$SAIDI = \frac{\sum_{i \in \Upsilon_f, \forall f} NC_i CID_i}{\sum_{i \in \Upsilon_f, \forall f} NC_i} \tag{3}$$

$$EENS = \sum_{h \in H} \frac{\Delta_h}{8760} \sum_{i \in \Psi} CID_i \mu_h L_i \tag{4}$$

$$CID_i \leq \varepsilon_i^{CID}, \forall i \in \Upsilon_f, \forall f \tag{5}$$

$$SAIDI \leq \varepsilon^{SAIDI} \tag{6}$$

$$EENS \leq \varepsilon^{EENS} \tag{7}$$

Here, $CID_i$ represents average outage time of a branch (feeder segment) i of a feeder line f in the power distribution network per year; $Y_f$ represents a set of all the feeder segments of the feeder line f; $\lambda_s$ represents a failure rate of a feeder segment s per year; and $t_i^{in,s}$ represents an outage time in a failure scenario of the feeder segment s.

Further, SAIDI represents an average outage time of the system per year; and $NC_i$ represents a number of users in the feeder segment i.

Further, EENS represents an expected loss of load energy; H represents a set of all load levels; $\Delta_h$ represents hours for which the load level h lasts per year; $\Psi$ represents a set of all the nodes in the power distribution network; $\mu_h$ represents a peak load ratio of the load level h and $\mu_h \leq 1$; and $L_i$ represents a peak load at the node i.

Further, $\varepsilon_i^{CID}$ represents an upper limit for the average outage time of the feeder segment i per year; $\varepsilon^{SAIDI}$ represents an upper limit for the average outage time of the system per year; and $\varepsilon^{EENS}$ represents an upper limit for the expected loss of load energy of the system.

In some embodiments, the constraint conditions may further include outage-time constraints, as expressed by the following formulas (8) to (12):

$$\begin{cases} t_i^{in,s} \leq M(1-p_i^s) + \sum_j m_{sj}^{FSM} t_j^{F,1} + \sum_j m_{ij}^{FSM} t_j^{F,2}, m_{is}^{FSM} = 0 \\ t_i^{in,s} \geq -M(1-p_i^s) + \sum_j m_{sj}^{FSM} t_j^{F,1} + \sum_j m_{ij}^{FSM} t_j^{F,2}, m_{is}^{FSM} = 0 \\ t_i^{in,s} \leq M(1-p_i^s) + \sum_j m_{sj}^{BSM} t_j^{B,1} + \sum_j m_{ij}^{BSM} t_j^{B,2}, m_{is}^{FSM} = 1 \\ t_i^{in,s} \geq -M(1-p_i^s) + \sum_j m_{sj}^{BSM} t_j^{B,1} + \sum_j m_{ij}^{BSM} t_j^{B,2}, m_{is}^{FSM} = 1 \\ -Mp_i^s + T_s^{sw} \leq t_i^{in,s} \leq Mp_i^s + T_s^{sw}, m_{is}^{FSM} = 0 \\ -Mp_i^s + T_s^{sw} \leq t_i^{in,s} \leq Mp_i^s + T_s^{sw}, m_{is}^{FSM} = 1, m_{is}^{BSM} = 0, m_{ii}^{BSM} = 1 \\ -Mp_i^s + T_s^{rp} \leq t_i^{in,s} \leq Mp_i^s + T_s^{rp}, m_{is}^{FSM} = 1, m_{is}^{BSM} = 0, m_{ii}^{BSM} = 0 \\ -Mp_i^s + T_s^{rp} \leq t_i^{in,s} \leq Mp_i^s + T_s^{rp}, m_{is}^{FSM} = 1, m_{is}^{BSM} = 1 \end{cases}, \forall i \in \Upsilon_f \tag{8}$$

$$t_j^{F,1} = T_j^{F,1} x_{ij}^A,$$

if the feeder section $i$ is an upstream feeder section of a feeder section $j$ in a root node direction, $\forall j \in \delta_f$ (9)

$$t_j^{F,2} = T_j^{F,2} x_{ij}^A,$$

if the feeder section $i$ is an upstream feeder section of the feeder section $j$ in the root node direction, $\forall j \in Y_f$ (10)

$$t_j^{B,1} = T_j^{B,1} x_{ij}^A,$$

if the feeder section $i$ is an upstream feeder section of the feeder section $j$ in an interconnection switch direction, $\forall j \in Y_f$ (11)

$$t_j^{B,1} = T_j^{B,2} x_{ij}^A,$$

if the feeder section $i$ is an upstream feeder section of the feeder section $j$ in the interconnection switch direction, $\forall j \in Y_f$ (12)

Here, as described above, $t_i^{in,s}$ represents the outage time of the feeder segment i in the failure scenario of the feeder segment s. Further, M represents a large positive number in a range of 10,000-10,000,000, and is 1,000,000 in this example. $p_i^s$ represents a 0-1 variable indicating whether power supply is restored in the feeder segment i after the automatic operations of the circuit breaker and the switch in the failure of the feeder segment s, with $p_i^s=1$ indicating the power supply being restored and $p_i^s=0$ indicating the power supply not being restored. $m_{sj}^{FSM}$ represents a 0-1 variable indicating whether the feeder segment j is located in a path from the feeder segment s to a root node (i.e., a transformer node), with $m_{sj}^{FSM}=1$ indicating the feeder segment j being located in the path and mss=0 indicating not located. $t_j^{F,1}$ represents a time variable of a first auto-reclosing for a first device in the upstream of the feeder segment j in the root node direction. $t_j^{F,2}$ represents a time variable of a second auto-reclosing for the first device in the upstream of the feeder segment j in the root node direction. $m_{ij}^{FSM}$ represents a 0-1 variable indicating whether the feeder segment j is located in a path from the feeder segment i to the root node, with $m_{ij}^{FSM}=1$ indicating the feeder segment j being located in the path and $m_{ij}^{FSM}=0$ indicating not located. $m_{is}^{FSM}$ represents a 0-1 variable indicating whether the feeder segment i is located in a path from the feeder segment s to the root node, with $m_{is}^{FSM}=1$ indicating the feeder segment i being located in the path and $m_{is}^{FSM}=0$ indicating not located.

Further, $m_{sj}^{BSM}$ represents a 0-1 variable indicating whether the feeder segment j is located in a path from the feeder segment s to the interconnection switch, with $m_{sj}^{BSM}=1$ indicating the feeder segment j being located in the path and mr=0 indicating not located. $t_{ij}^{B,1}$ represents a time variable of a second auto-reclosing for a first device in the upstream of the feeder segment j in an interconnection switch direction. $m_{ij}^{BSM}$ represents a 0-1 variable indicating whether the feeder segment j is located in a path from the feeder segment i to the interconnection switch, with $m_{ij}^{BSM}=1$ indicating the feeder segment j being located in the path and $m_{ij}^{BSM}=0$ indicating not located. $t_j^{B,2}$ represents a time variable of a second auto-reclosing for the first device in the upstream of the feeder segment j in the interconnection switch direction. Further, as described above, $Y_f$ represents a set of all the feeder segments of the feeder line f.

Further, $T_s^{sw}$ represents a manual operation time of the circuit breaker and the switch in the failure of the feeder segment s. $m_{is}^{BSM}$ represents a 0-1 variable indicating whether the feeder segment i is located in a path from the feeder segment s to the interconnection switch, with $m_{is}^{BSM}=1$ indicating the feeder segment i being located in the path and $m_{is}^{BSM}=0$ indicating not located.

Further, $m_{ii}^{BSM}$ represents a 0-1 variable indicating whether the feeder segment i is located in a path from the feeder segment i to the interconnection switch, with $m_{ii}^{BSM}=1$ indicating the feeder segment i being located in the path and $m_{ii}^{BSM}=0$ indicating not located. $T_s^{rp}$ represents a fault recovery time in the failure of the feeder segment s. $T_j^{F,1}$ represents a set time value of the first auto-reclosing (generally, 3-5 seconds) for the first device in the upstream of the feeder segment j in the root node direction. $T_j^{F,2}$ represents a set time value of the second auto-reclosing (generally, 3-5 seconds) for the first device in the upstream of the feeder segment j in the root node direction. $T_j^{B,1}$ represents a set time value of the first auto-reclosing (generally, 3-5 seconds) for the first device in the upstream of the feeder segment j in the interconnection switch direction. $T_j^{B,2}$ represents a set time value of the second auto-reclosing (generally, 3-5 seconds) for the first device in the upstream of the feeder segment j in the interconnection switch direction.

In some embodiments, the constraint conditions may further include post-fault network reconstruction constraints, as expressed by the following formulas (13) to (17):

$$p_s^s=0 \quad (13)$$

$$-M(1-y_{ij}^s)+p_j^s \leq p_i^s \leq M(1-y_{ij}^s)+p_j^s, \forall ij \in \Omega \quad (14)$$

$$d_i^s=p_i^s L_i \quad (15)$$

$$\Sigma_{j \in i} P_{ji}^s=d_i^s \quad (16)$$

$$-P_{ij}^{max} y_{ij}^s \leq P_{ij}^s \leq P_{ij}^{max} y_{ij}^s \quad (17)$$

Here, $p_s^s$ represents a 0-1 variable indicating whether the power supply is restored in the feeder segment s after the automatic operations of the circuit breaker and the switch in the failure of the feeder segment, with $P_s^s=1$ indicating the power supply being restored and $p_s^s=0$ indicating the power supply not being restored.

Here, $y_{ij}^s$ represents a 0-1 variable indicating a state of the equipment ij after its automatic operation in the failure of the feeder segment s, with $y_{ij}^s=1$ indicating a closed state and $y_{ij}^s=0$ indicating an opened state. $p_j^s$ represents a 0-1 variable indicating whether the power supply is restored in the feeder segment j after the automatic operations of the circuit breaker and the switch in the failure of the feeder segment s, with $p_j^s=1$ indicating the power supply being restored and $p_j^s=0$ indicating the power supply not being restored. $p_i^s$ represents a 0-1 variable indicating whether power supply is restored in the feeder segment i after the automatic operations of the circuit breaker and the switch in the failure of the feeder segment s, with $p_i^s=1$ indicating the power supply being restored and $p_i^s=0$ indicating the power supply not being restored. $\Omega$ represents a set of all the equipment in the power distribution network, including the circuit breaker and the switch.

Further, $d_i^s$ represents an active load of the feeder segment i in the failure of the feeder segment s, and $L_i$ represents the peak load at the node i.

Further, $P_{ji}^s$ represents an active power of the feeder section j flowing to the feeder section i through the equipment ij in the failure of the feeder segment s ($P_{ji}^s=-P_{ij}^s$).

Further, $P_{ij}^{max}$ represents a maximum active power that can be passed through the equipment.

In some embodiments, the constraint conditions may further include equipment state constraints, as expressed by the following formulas (18) to (20):

$$y_{ij}^s \geq 1-x_{ij}^A, \forall ij \in \Omega_{SW} \quad (18)$$

$$y_{ij}^s \leq x_{ij}^A, \forall ij \in \Omega_{CB} \quad (19)$$

$$x_{ij}^A \geq x_{ij}^{A,E}, \forall ij \in \Omega \quad (20)$$

Here, as described above, $y_{ij}^s$ represents a 0-1 variable indicating a state of the equipment ij after its automatic operation in the failure of the feeder segment s, with $y_{ij}^s=1$ indicating a closed state and $y_{ij}^s=0$ indicating an opened state; $x_{ij}^A$ represents a 0-1 variation indicating an automatic status of the equipment ij after the transformation, with $x_{ij}^A=1$ indicating an automatic equipment and $x_{ij}^A=0$ indicating a non-automatic equipment; and $x_{ij}^{A,E}$ represents a 0-1 variation indicating the automatic status of the equipment ij before the transformation, with $x_{ij}^{E,E}=1$ indicating the automatic equipment and $x_{ij}^{A,E}=0$ indicating the non-automatic equipment. Further, $\Omega_{SW}$ represents a set of the switches; $\Omega_{CB}$ represents a set of the circuit breakers; and $\Omega$ represents a set of all the equipment in the in the power distribution network.

In step S140, an optimization model for evaluating the reliability of the power distribution network based on the reliability constraints is established in accordance with the target function and the constraints.

In an embodiment, the optimization model may be a mixed integer linear programming model.

In step S150, the established optimization model for evaluating the reliability of the power distribution network based on the reliability constraints is solved to obtain an optimal solution of the 0-1 variable $x_{ij}^A$ indicating an automatic status of the equipment ij after the transformation, as an optimization result of the automation transformation state of the circuit breaker and the switch, and to obtain optimal solutions of the customer interruption duration $CID_i$ of the feeder segment i, the system average interruption duration SAIDI and the expected energy not supplied EENS, as an optimization result of the reliability index, so as to transform the automation equipment in the distribution network based on the optimization result of the automation transformation state and the reliability index.

In an embodiment, the established optimization model for evaluating the reliability of the power distribution network based on the reliability constraints may be solved through branch-and-bound and linear programming methods.

The method for optimizing the transformation of the automation equipment in the power distribution network based on the reliability constraints according to the embodiments of the present disclosure takes the transformation cost of the power distribution network as the target function, and models the automation transformation of the circuit breakers and switches in the entire power distribution network as a mixed integer linear programming model. By solving the model, the transformation results that satisfies the reliability constraints may be achieved directly. When calculating the reliability index, the method takes into account the tripping of the circuit breakers, the automatic and manual isolation of faults, and the restoration of the power supply to the affected loads based on the network reconstruction. The method according to the present disclosure is simple and efficient, which may effectively reduce the transformation cost of the power distribution network, and guide the staff of the power distribution network to accurately and efficiently implement the automation upgrading and transformation of the feeder lines in the power distribution network.

Although the embodiments of the present disclosure have been shown and described above, it will be understood that the above embodiments are exemplary and shall not be understood as restrictions on the present disclosure. Those skilled in the art may change, modify, replace and modify the above embodiments within the scope of the present disclosure.

What is claimed is:

1. A method for optimizing transformation of automation equipment in a power distribution network based on reliability, comprises:
   determining installation states of respective components in the power distribution network and operation criterions for fault isolation, load transfer and fault recovery after a fault occurred in a feeder segment;
   determining a target function, the target function being a target function for Total of the power distribution network, as minimizing a total transformation cost C expressed by the following formula (1):

$$\text{Minimize } c^{Total} = \sum_{ij \in \Omega} c_{ij}^{Up}\left(x_{ij}^{A} - x_{ij}^{A,E}\right) \tag{1}$$

where:
$c_{ij}^{Up}$ represents a transformation cost for upgrading equipment ij in the power distribution network;
$\Omega$ represents a set of all the equipment in the power distribution network, comprising a circuit breaker and switch;
$x_{ij}^{A}$ represents a 0-1 variation indicating an automatic status of the equipment ij after the transformation, with $x_{ij}^{A}$ indicating an automatic equipment and $x_{ij}^{A}=0$ indicating a non-automatic equipment; and
$x_{ij}^{A,E}$ represents a 0-1 variation indicating the automatic status of the equipment ij before the transformation, $x_{ij}^{A,E}$ with indicating the automatic equipment and $x_{ij}^{A,E}=0$ indicating the non-automatic equipment;
determining constraint conditions, the constraint conditions comprising reliability constraints, as expressed by the following formulas (2) to (7):

$$CID_i = \sum_{s \in \Upsilon_f} \lambda_s t_i^{in,s} \tag{2}$$

$$SAIDI = \frac{\sum_{i \in \Upsilon_f, \forall f} NC_i CID_i}{\sum_{i \in \Upsilon_f, \forall f} NC_i} \tag{3}$$

$$EENS = \sum_{h \in H} \frac{\Delta_h}{8760} \sum_{i \in \Psi} CID_i \mu_h L_i \tag{4}$$

$$CID_i \le \varepsilon_i^{CID}, \forall i \in \Upsilon_f, \forall f \tag{5}$$

$$SAIDI \le \varepsilon^{SAIDI} \tag{6}$$

$$EENS \le \varepsilon^{EENS} \tag{7}$$

where:
$CID_i$ represents average outage time of a feeder segment i of a feeder line f in the power distribution network per year;
$\Upsilon_f$ represents a set of all feeder segments of the feeder line f;
$\lambda_s$ represents a failure rate of a feeder segment s per year;
$t_i^{ins}$ represents an outage time in a failure scenario of the feeder segment s;
$SAID_i$ represents an average outage time of the network per year;
$NC_i$ represents a number of users in the feeder segment i;
EENS represents an expected loss of load energy;
H represents a set of all load levels;
$\Delta_h$ represents hours for which the load level h lasts per year;
$\Psi$ represents a set of all nodes in the power distribution network;
$\mu_h$ represents a peak load ratio of the load level h and $\mu_h \le 1$;
$L_i$ represents a peak load at the node i;
$\varepsilon_i^{CID}$ represents an upper limit for the average outage time of the feeder segment i per year;
$\varepsilon^{SAIDI}$ represents an upper limit for the average outage time of the network per year; and
$\varepsilon^{EENS}$ represents an upper limit for the expected loss of load energy of the network;
establishing an optimization model for evaluating the reliability of the power distribution network based on the reliability constraints in accordance with the target function and the constraint conditions; and
solving the established optimization model for evaluating the reliability of the power distribution network based on the reliability constraints to obtain an optimal solution of 0-1 variable $x_{ij}^{A}$ indicating an automatic status of the equipment ij after the transformation, as an optimization result of the automation transformation state of the circuit breaker and the switch, and to obtain optimal solutions of the customer interruption duration $CID_i$ of the feeder segment i, the network average interruption duration SAIDI and the expected energy not supplied EENS, as an optimization result of the reliability index, so as to transform the automation equipment in the distribution network based on the optimization result of the automation transformation state and the reliability index,
wherein:
the power distribution network comprises at least one feeder line;
the circuit breaker that is capable of interrupting a fault current is installed at the head of each feeder line;

each feeder line is divided into a plurality of feeder segments via at least one interconnection switch that is not capable of interrupting the fault current;

at least one of the plurality of feeder segments is a feeder segment that is contained in a feeder corridor;

0 or 1 interconnection switch is provided between each feeder line and other feeder line; and the distribution network comprises an automatic circuit breaker and an automatic switch which detects currents and voltages in interfaces at both ends of the feeder line and make response accordingly, and a non-automatic circuit breaker and a non-automatic switch which are operated manually, and wherein, the step of determining installation states and operation criterions further comprises:

a) opening the automatic circuit breaker or the non-automatic circuit breaker at the head of the feeder line a feeder segment belongs to, upon the feeder segment fails, to interrupt the fault current, resulting in power outage in downstream nodes of the circuit breaker, and all automatic switches in the feeder line the feeder segment belongs to being opened;

b) entering an automatic operation stage upstream of fault and proceeding to step c) if the circuit breaker is the automatic circuit breaker, or proceeding to step g) if the circuit breaker is the non-automatic circuit breaker;

c) reclosing the automatic circuit breaker in the automatic operation stage in the upstream of fault;

d) in response to the reclosing operation not triggering a further tripping operation of the automatic circuit breaker, sensing a one-side normal voltage by the first automatic switch in a downstream of the automatic circuit breaker and closing the first automatic switch in a short interval, or in response to the reclosing operation triggering a further tripping operation of the automatic circuit breaker, proceeding to step g);

e) sensing the one-side normal voltage by other automatic switches and closing the other automatic switches sequentially on a timed interval after the first automatic switch downstream of the automatic circuit breaker is closed, until the closing operation of an automatic switch which has been just closed causes a second fault tripping, such that all circuit breakers in the upstream of the automatic switch which has been just closed are tripped, all the automatic switches in the feeder line are opened again, causing the automatic switch which has been just closed and caused the second fault tripping to be opened and locked in the open state;

f) reclosing the automatic circuit breaker again, and repeating the steps d) to e) until all switches in a non-locked state in the upstream of the fault are reclosed again, and entering an automatic operation stage in the downstream of fault;

g) in response to an automatic interconnection switch existing in the downstream of the fault, closing the automatic interconnection switch after a preset delay time after the fault occurred in the automatic operation stage in the downstream of fault;

h) in response to the closing operation of the automatic interconnection switch not triggering a tripping operation of the interconnection switch, sensing the one-side normal voltage by the first automatic switch in the upstream of the automatic interconnection switch and closing the first automatic switch in a short interval, or in response to the closing operation of the automatic interconnection switch triggering the tripping operation, proceeding to step k);

i) sensing the one-side normal voltage by other automatic switches and closing the other automatic switches sequentially on a timed interval after the first automatic switch in the upstream of the automatic interconnection switch is closed, until the closing operation of an automatic switch which has been just closed causes a tripping of the automatic interconnection switch, such that all the automatic switches in the feeder line in the downstream of fault are opened again, causing the automatic switch which has been just closed and caused the tripping of the automatic interconnection switch to be opened and locked in the open state;

(j) closing the automatic interconnection switch again, and repeating the steps h) to i) until all the automatic switches in an unlocked state in the downstream of fault are closed again, and entering a post-fault manual operation stage; and (k) operating the non-automatic circuit breaker and the non-automatic switch manually in the post-fault manual operation stage, to further isolate the fault and to restore the affected load from the fault, such that the faulty feeder segment is restored, and the power distribution network are restored by operating the non-automatic switch and the non-automatic circuit breaker.

2. The method according to claim 1, wherein the constraint conditions further comprise outage-time constraints, as expressed by the following formulas (8) to (12):

$$\begin{cases} t_i^{in,s} \leq M(1-p_i^s) + \sum_j m_{sj}^{FSM} t_j^{F,1} + \sum_j m_{ij}^{FSM} t_j^{F,2}, \ m_{is}^{FSM} = 0 \\ t_i^{in,s} \geq -M(1-p_i^s) + \sum_j m_{sj}^{FSM} t_j^{F,1} + \sum_j m_{ij}^{FSM} t_j^{F,2}, \ m_{is}^{FSM} = 0 \\ t_i^{in,s} \leq M(1-p_i^s) + \sum_j m_{sj}^{BSM} t_j^{B,1} + \sum_j m_{ij}^{BSM} t_j^{B,2}, \ m_{is}^{FSM} = 1 \\ t_i^{in,s} \geq -M(1-p_i^s) + \sum_j m_{sj}^{BSM} t_j^{B,1} + \sum_j m_{ij}^{BSM} t_j^{B,2}, \ m_{is}^{FSM} = 1 \\ -Mp_i^s + T_s^{sw} \leq t_i^{in,s} \leq Mp_i^s + T_s^{sw}, m_{is}^{FSM} = 0 \\ -Mp_i^s + T_s^{sw} \leq t_i^{in,s} \leq Mp_i^s + T_s^{sw}, m_{is}^{FSM} = 1, m_{is}^{BSM} = 0, m_{ii}^{BSM} = 1 \\ -Mp_i^s + T_s^{rp} \leq t_i^{in,s} \leq Mp_i^s + T_s^{rp}, m_{is}^{FSM} = 1, m_{is}^{BSM} = 0, m_{ii}^{BSM} = 0 \\ -Mp_i^s + T_s^{rp} \leq t_i^{in,s} \leq Mp_i^s + T_s^{rp}, m_{is}^{FSM} = 1, m_{is}^{BSM} = 1 \end{cases} \quad , \forall i \in \Upsilon_f \qquad (8)$$

$$t_j^{F,1} = T_j^{F,1} x_{ij}^A,$$

if the feeder section $i$ is an upstream feeder section of a feeder section $j$ in a root-node direction, $\forall j \in Y_f$ (9)

$$t_j^{F,2} = T_j^{F,2} x_{ij}^A,$$

if the feeder section $i$ is an upstream feeder section of the feeder section $j$ in the root-node direction, $\forall j \in Y_f$ (10)

$$t_j^{B,1} = T_j^{B,1} x_{ij}^A,$$

if the feeder section $i$ is an upstream feeder section of the feeder section $j$ in an interconnection-switch direction, $\forall j \in Y_f$ (11)

$$t_j^{B,1} = T_j^{B,2} x_{ij}^A,$$

if the feeder section $i$ is an upstream feeder section of the feeder section $j$ in the interconnection-switch direction, $\forall j \in Y_f$ (12)

where:
- M represents a large positive number in a range of 10,000-10,000,000;
- $p_i^s$ represents a 0-1 variable indicating whether a power supply is restored in the feeder segment i after the automatic operations of the circuit breaker and the switch in the failure of the feeder segment s, with $p_i^s=1$ indicating the power supply being restored and $p_i^s=0$ indicating the power supply not being restored;
- $m_{sj}^{FSM}$ represents a 0-1 variable indicating whether a feeder segment j is located in a path from the feeder segment s to a root node, with $m_{sj}^{FSM}=1$ indicating the feeder segment j being located in the path and $m_{sj}^{FSM}=0$ indicating not located;
- $t_j^{F,1}$ represents a time variable of a first auto-reclosing for a first device in the upstream of the feeder segment j in the root node direction;
- $t_j^{F,2}$ represents a time variable of a second auto-reclosing for the first device in the upstream of the feeder segment j in the root node direction;
- $m_{ij}^{FSM}$ represents a 0-1 variable indicating whether the feeder segment j is located in a path from the feeder segment i to the root node, with $m_{ij}^{FSM}=1$ indicating the feeder segment j being located in the path and $m_{ij}^{FSM}=0$ indicating not located;
- $m_{is}^{FSM}$ represents a 0-1 variable indicating whether the feeder segment i is located in a path from the feeder segment s to the root node, with is $m_{is}^{FSM}=1$ indicating the feeder segment i being located in the path and $m_{is}^{FSM}=0$ indicating FSM not located;
- $m_{sj}^{BSM}$ represents a 0-1 variable indicating whether the feeder segment j is located in a path from the feeder segment s to the automatic interconnection switch, with $m_{sj}^{BSM}=1$ indicating the feeder segment j being located in the path and $m_{si}^{BSM}=0$ indicating not located;
- $t_j^{B,1}$ represents a time variable of a second auto-reclosing for a first device in the upstream of the feeder segment j in the interconnection switch direction;
- $m_{ij}^{BSM}$ represents a 0-1 variable indicating whether the feeder segment j is located in a path from the feeder segment i to the automatic interconnection switch, with $m_{ij}^{BSM}=1$ indicating the feeder segment j being located in the path and $m_{ij}^{BSM}=0$ indicating not located;
- $t_j^{B,2}$ represents a time variable of a second auto-reclosing for the first device in the upstream of the feeder segment j in the interconnection switch direction;
- $T_s^{sw}$ represents a manual operation time of the circuit breaker and the switch in the failure of the feeder segment s;
- $m_{is}^{BSM}$ represents a 0-1 variable indicating whether the feeder segment i is located in a path from the feeder segment s to the automatic interconnection switch, with $m_{is}^{BSM}=1$ indicating the feeder segment i being located in the path and $m_{is}^{BSM}=0$ indicating not located;
- $m_{ij}^{BSM}$ represents a 0-1 variable indicating whether the feeder segment i is located in a path from the feeder segment i to the automatic interconnection switch, with $m_{ii}^{BSM}=1$ indicating the feeder segment i being located in the path and $m_{ii}^{BSM}=0$ indicating not located;
- $Trp_s^{rp}$ represents a fault recovery time in the failure of the feeder segment s;
- $T_j^{F,1}$ represents a set time value of the first auto-reclosing for the first device in the upstream of the feeder segment j in the root node direction;
- $T_j^{F,2}$ represents a set time value of the second auto-reclosing for the first device in the upstream of the feeder segment j in the root node direction;
- $T_j^{B,1}$ represents a set time value of the first auto-reclosing for the first device in the upstream of the feeder segment j in the interconnection switch direction; and
- $T_j^{B,2}$ represents a set time value of the second auto-reclosing for the first device in the upstream of the feeder segment j in the interconnection switch direction.

3. The method according to claim 1, wherein the constraint conditions further comprise post-fault network reconstruction constraints, as expressed by the following formulas (13) to (17):

$$p_s^s = 0 \tag{13}$$

$$-M(1-y_{ij}^s) + p_j^s \leq p_i^s \leq M(1-y_{ij}^s) + p_j^s, \forall\, ij \in \Omega \tag{14}$$

$$d_i^s = p_i^s L_i \tag{15}$$

$$\sum_{j \in i} P_{ji}^s = d_i^s \tag{16}$$

$$-P_{ij}^{max} y_{ij}^s \leq P_{ij}^s \leq P_{ij}^{max} y_{ij}^s \tag{17}$$

where:
- $p_s^s$ represents a 0-1 variable indicating whether a power supply is restored in the feeder segment s after the automatic operations of the circuit breaker and the switch in the failure of the feeder segment s, with $p_s^s=1$ indicating the power supply being restored and $p_s^s=0$ indicating the power supply not being restored;
- $y_{ij}^s$ represents a 0-1 variable indicating a state of the equipment ij after its automatic operation in the failure of the feeder segment s, with $y_{ij}^s=1$ indicating a closed state and $y_{ij}^s=0$ indicating an opened state;
- $p_j^s$ represents a 0-1 variable indicating whether the power supply is restored in the feeder segment j after the automatic operations of the circuit breaker and the switch in the failure of the feeder segment s, with $p_j^s=1$ indicating the power supply being restored and $p_j^s=0$ indicating the power supply not being restored;
- $p_i^s$ represents a 0-1 variable indicating whether a power supply is restored in the feeder segment i after the automatic operations of the circuit breaker and the switch in the failure of the feeder segment s, with $p_i^s=1$ indicating the power supply being restored and $p_i^s=0$ indicating the power supply not being restored;

$d_i^s$ represents an active load of the feeder segment i in the failure of the feeder segment s;

$L_i$ represents the peak load at the node i;

$P_{ji}^s$ represents an active power of the feeder section j flowing to the feeder section i through the equipment ij in the failure of the feeder segment s, $P_{ji}^s = -P_{ij}^s$; and $p_{ij}^{max}$ represents a maximum active power that can be passed through the equipment ij.

4. The method according to claim 1, wherein the constraint conditions further comprise equipment state constraints, as expressed by the following formulas (18) to (20):

$$y_{ij}^s \geq 1 - x_{ij}^A, \forall ij \in \Omega_{SW} \quad (18)$$

$$y_{ij}^s \leq x_{ij}^A, \forall ij \in \Omega_{CB} \quad (19)$$

$$x_{ij}^A \geq x_{ij}^{A,E}, \forall ij \in \Omega \quad (20)$$

where;

$y_{ij}^s$ represents a 0-1 variable indicating a state of the equipment ij after its automatic operation in the failure of the feeder segment s, with $y_{ij}^s = 1$ indicating a closed state and $y_{ij}^s = 0$ indicating an opened state;

$x_{ij}^A$ represents a 0-1 variation indicating an automatic status of the equipment ij after the transformation, with $x_{ij}^A = 1$ indicating the automatic equipment and $x_{ij}^A = 0$ indicating the non-automatic equipment;

$x_{ij}^{A,E}$ represents a 0-1 variation indicating the automatic status of the equipment ij before the transformation, with $x_{ij}^{A,E} = 1$ indicating the automatic equipment and $x_{ij}^{A,E} = 0$ indicating the non-automatic equipment;

$\Omega_{SW}$ represents a set of the switches; and $\Omega_{CB}$ represents a set of the circuit breakers.

5. The method according to claim 1, wherein the optimization model is a mixed integer linear programming model.

6. The method according to claim 1, wherein the established optimization model for evaluating the reliability of the power distribution network based on the reliability constraints is solved through branch-and-bound and linear programming methods.

* * * * *